March 5, 1968  R. J. DWYER  3,371,574
OIL DETECTION DEVICE UTILIZING RAMAN RADIATION
Filed July 31, 1963
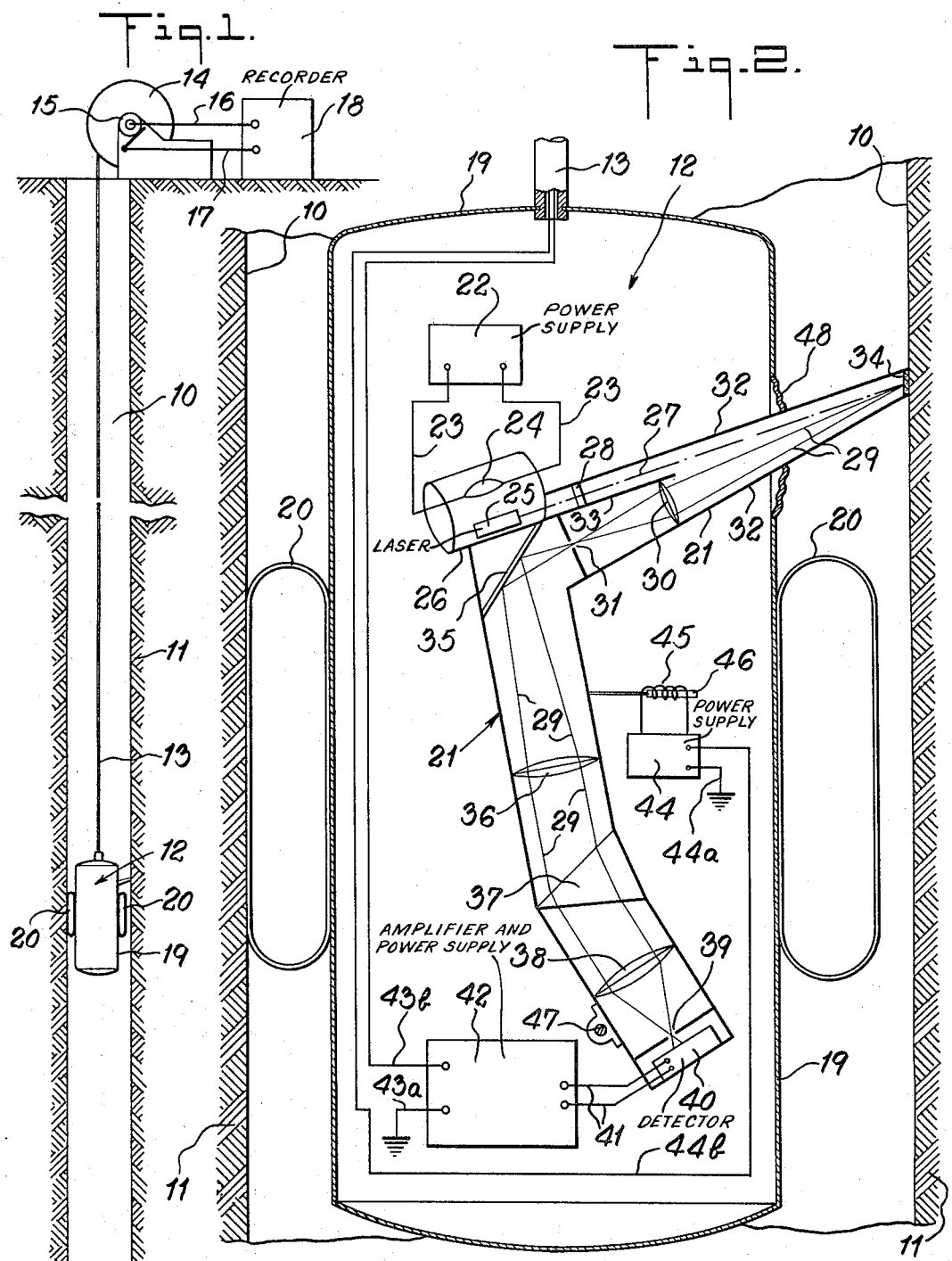
INVENTOR.
ROBERT J. DWYER
BY
Charles P. Bauer
ATTORNEY

United States Patent Office 3,371,574
Patented Mar. 5, 1968

3,371,574
OIL DETECTION DEVICE UTILIZING RAMAN RADIATION
Robert J. Dwyer, 46A Seth Court,
Staten Island, N.Y. 10301
Filed July 31, 1963, Ser. No. 298,975
4 Claims. (Cl. 88—14)

ABSTRACT OF THE DISCLOSURE

Unitary means for lowering into a bore hole to find oil including a monochromatic radiation source which is a laser, a spectrometer filter, a detector for Raman radiation and a transmitter which takes the scattered Raman radiation filtered on each side of the 3000 reciprocal wave number characteristic of the detected C–H vibration resonance frequency and transmits it in the form of a pulse to the surface of the ground to demonstrate traces of oil in said hole.

---

The present invention relates to a device and method for use in oil well drilling and more particularly for the detection of oil in the earth formations surrounding the bore hole.

Various methods and devices have been employed to determine the nature of the formations in the bore hole but none of such methods and devices will detect the presence of petroleum oils. Such methods and devices require further interpretations which might indicate the mere possibility of oil being present but such interpretations are by no means conclusive. It has been determined that oil can be detected by sending essentially monochromatic light or radiation onto oil bearing media and observing the Raman effect. If oil is present the scattered light will contain Raman lines due to the C–H resonance around 3000 cm.$^{-1}$ wave number. These can be separated from the scattered light of the source frequency by a spectrograph and detected by a photocell. The present invention is directed to that method.

It is an object of the present invention to provide a device which can be lowered into the bore hole for carrying out such method.

It is a further object of the invention to provide a method and device whereby a continuous survey may be made from the top to bottom of the walls of a bore hole without any necessity for cutting and removing core samples.

Another object of the invention is to provide a device which permits readings at the surface from which a determination can be made as to the presence of oil in the bore hole.

Other objects of the invention will in part be obvious and will in part appear hereinafter.

The invention accordingly comprises the several steps and the relation of one or more of such steps with respect to each of the others, and the article possessing the features properties and the relation of elements, which are exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 1 is a vertical sectional view through a portion of a bore hole showing the device of the present invention as it is being moved through the hole; and FIGURE 2 is an enlarged sectional view of the device of the present invention.

Referring more particularly to the drawing there is shown in FIGURE 1 a bore hole 10 which has been drilled through earth formations 11. These formations may or may not contain petroleum oil. However, if oil is present it may vary in amount from a mere trace to a substantially saturated condition. If an oil based drilling mud had been used the entire wall of the hole would be coated with oil so that the present method and device would not function under such conditions. If a water based drilling mud is used the present method and device would work at the upper levels. At great depths the pressure of the drilling mud becomes so great the mud penetrates the walls and makes it difficult to detect traces of oil that might have penetrated the wall. Consequently it will be seen that the present method and device will work most efficiently in dry holes and at moderate depths in holes drilled with water based mud.

The device 12 can be raised or lowered through the hole by means of an insulated cable 13. This cable is wound onto the reel 14 of a winch 15 or other suitable power mechanism. Disposed within the cable 13 are wires through which the indications or recordings are transmitted from the well to the surface. Such indications or recordings are fed through wires 16 and 17 to a recording instrument 18. The outer container 19 of the device 12 is provided with spring members 20 which serve to center the container in the bore hole. Furthermore, the spring member under the light tube protects such tube from damage when the container is being raised.

Referring to FIGURE 2, the container 19 encloses a casing 21 which holds the optical system hereinafter described. There is a power supply 22 which produces pulses of electricity at regular intervals. These pulses are fed through wires 23 to the flash lamp 24 which gives a bright flash of white light and excites or pumps a laser crystal 25. It has been determined that a ruby laser because of its wave length and high light intensity is particularly well suited for this system, but other lasers will undoubtedly operate satisfactorily. The purpose of the laser or other light source is to provide a beam of essentially monochomatic light onto the oil bearing media. The flash lamp 24 and the laser 25 are enclosed within an elliptic reflecting mirror 26 to concentrate light from the lamp onto the laser crystal.

The beam of light 27 from the laser is passed through an optical filter 28 to eliminate light of other wave lengths than the ruby laser crystal wave length of 6943 angstrom units (A.U.). This beam is directed against the wa'l of the bore hole which may contain oil bearing media. As the beam hits this media the scattered light 29 is picked up and passes through a lens 30 and a slit 31. This entire optical path of directed and picked up light is encased within a tube or pipe 32 which is painted flat black on the inside to reduce light scattering. This pipe 32 is part of the entire case 21. As a means of separating the directed beam and the picked up light rays a baffle 33 painted flat black is placed within the pipe 32. The pipe has a transparent window 34 at the end coming into contact with the bore hole media. In some cases where the device is moved through dry holes, such as drilled by cable drilling equipment, it may be possible to eliminate the pipe 32 in which case a light beam or radiation could be directed through a window onto the wall and the scattered light or radiation picked up through the same or another window.

The light rays 29 pass from the slit 31 to a mirror 35, then through the collimating lens 36, prism 37 and lens 38 of a spectroscope, and finally through an exit slit 39 to a photomultiplier tube 40. The slit 39 must reject the Raman water line at 3151 cm.$^{-1}$. Using a ruby laser it is satisfactory if it passes a band of wave lengths between 8620 A.U. and 8880 A.U. If the wave lengths are out of this range the recording instrument at the surface will indicate no readings whereas within the specified range the instrument will show a reading indicating the presence of oil. Using a source at 5000 A.U. it will need to pass a band from 5815 A.U. to 5925 A.U. It will be noted that the light rays are diverging from slit 31 to mirror 35 and from mirror 35 to lens 36, parallel from lens 36 to prism 37, parallel in prism 37, and parallel from prism 37 to lens 38.

The output signal from the tube 40 passes through wires 41 to an amplifier and power supply 42 which furnishes power for the tube and amplifies the output signal. The amplified output signal is transmitted through ground wire 43a and cable wire 43b whereby recordings can be made at the surface. There is also a power supply 44, connected through ground wire 44a and cable wire 44b, which operates a coil 45 to move armature 46. This armature is connected to the casing 21 which casing in turn has a rotatable mounting 47 at its lower end within the container 19. As the armature moves the casing away it will be seen that the end of the pipe 32 is in turn moved away from the wall to permit the device to be moved upwardly through the hole. By so retracting the pipe away from the wall the spring 20 serves to protect the pipe from damage. When the device is to be lowered into the hole for recordings the armature can be activated to move the casing so that the pipe comes into contact with the wall of the bore hole. There is a flexible shield 48 around the pipe to prevent the entry of dirt or other matter into the container, which shield is of material adapted to withstand the pressures found in the depths of bore holes.

The operation of the device will be apparent from the foregoing description. The device may be moved continuously along the wall of the hole while desired indications or recordings are being taken. It is also possible to stop the device at different points along the hole and to take indications or recordings in a discontinuous manner. Since the C–H vibration resonance for oil molecules varies about 200 cm.$^{-1}$ on each side of 3000 cm.$^{-1}$ wave number, the Raman frequencies of the scattered light based on a ruby laser source would be in the band centered at 8769 angstrom units. If another source is used, for example 5000 angstrom units, the Raman frequencies of the scattered light would be in the band centered at 5882 angstrom units. The calculations for such determinations are as follows:

EXAMPLE I

Ruby laser wave length = 6943 angstrom
units = $6943 \times 10^{-8}$ cm. $\times 6.943 \times 10^{-5}$ cm.

Ruby laser frequency = $f_1 = \frac{c}{\lambda} = \frac{2.998 \times 10^{10 cm.} \cdot sec.}{6.943 \times 10^{-5} cm.} =$ $43.18 \times 10^{13}$ sec.$^{-1}$ or cycles per sec. (c.p.s.)

C–H resonance (in oil) band: wave number =
$$3000 \text{ cm.}^{-1} \pm$$

$200$ cm.$^{-1}$ $\left(\text{wave number} = \frac{1}{\text{wave length}} = \frac{1}{\lambda}\right)$ C–H frequency = $f_{C-H} = cx\frac{1}{\lambda} =$ $\begin{cases} 2.998 \times 10^{10 cm.} \cdot sec. \times 3200 \text{ cm.}^{-1} = 9.594 \times 10^{13} \text{ c.p.s.} \\ 2.998 \times 10^{10 cm.} \cdot sec. \times 3000 \text{ cm.}^{-1} = 8.994 \times 10^{13} \text{ c.p.s.} \\ 2.998 \times 10^{10 cm.} \cdot sec. \times 2800 \text{ cm.}^{-1} = 8.394 \times 10^{13} \text{ c.p.s.} \end{cases}$ Raman frequency: $f_R =$ $\begin{cases} 43.18 \times 10^{13} - 9.59 \times 10^{13} = 33.19 \times 10^{13} \text{ c.p.s.} \\ 43.18 \times 10^{13} - 8.99 \times 10^{13} = 34.19 \times 10^{13} \text{ c.p.s.} \\ 43.18 \times 10^{13} - 8.39 \times 10^{13} = 34.79 \times 10^{13} \text{ c.p.s.} \end{cases}$ Raman wave length: $\lambda_R =$ $\begin{cases} \frac{2.998 \times 10^{10}}{33.59 \times 10^{13}} = 8.922 \times 10^{-5} \text{ cm.} = 8922 \text{ A.U.} \\ \frac{2.998 \times 10^{10}}{34.19 \times 10^{13}} = 8.769 \times 10^{-5} \text{ cm.} = 8769 \text{ A.U.} \\ \frac{2.998 \times 10^{10}}{34.79 \times 10^{13}} = 8.617 \times 10^{-5} \text{ cm.} = 8617 \text{ A.U.} \end{cases}$ Water line: wave number = 3151 cm.

Water line frequency: $f_{H_2O} = cx\frac{1}{\lambda} = 2.998 \times$ $10^{10 cm.} \cdot$ sec. $\times 3151$ cm.$^{-1} = 9.447 \times 10^{13}$ c.p.s.

Water line: Raman frequency = $43.18 \times$ $10^{13} - 9.45 \times 10^{13} = 33.73 \times 10^{13}$ c.p.s.

Wave length of Raman water line =
$$\frac{2.998 \times 10^{10}}{33.73 \times 10^{13}} = 8.888 \times 10^{-5} = 8888 \text{ A.U.}$$

Slit before photomultiplier tube must reject 8888 A.U. It would be satisfactory if it passed the range between 8620 A.U. to 8880 A.U.

EXAMPLE II

Calculation based on arbitrary source, for example 5000 A.U.

Source wave length = 5000 angstrom
units = $5000 \times 10^{-8}$ cm. = $5.000 \times 10^{-5}$ cm.

Source frequency $f_s =$ $\frac{c}{\lambda} = \frac{2.998 \times 10^{10 cm.} \cdot sec.}{5.000 \times 10^{-5} cm.} = 5.996 \times 10^{14} = 59.96 \times 10^{13}$ c.p.s.

C–H resonance in oil band: wave number =
$$3000 \text{ cm.}^{-1} \pm 200 \text{ cm.}^{-1}$$

C–H frequency: $f_{C-H} = cx\frac{1}{\lambda} =$ $\begin{cases} 2.998 \times 10^{10 cm.} \cdot sec. \times 3200 \text{ cm.}^{-1} = 9.594 \times 10^{13} \text{ c.p.s.} \\ 2.998 \times 10^{10 cm.} \cdot sec. \times 3000 \text{ cm.}^{-1} = 8.994 \times 10^{13} \text{ c.p.s.} \\ 2.998 \times 10^{10 cm.} \cdot sec. \times 2800 \text{ cm.}^{-1} = 8.394 \times 10^{13} \text{ c.p.s.} \end{cases}$ Raman frequency: $f_R =$ $\begin{cases} 59.96 \times 10^{13} - 9.594 \times 10^{13} = 50.37 \times 10^{13} \text{ c.p.s.} \\ 59.96 \times 10^{13} - 8.994 \times 10^{13} = 50.97 \times 10^{13} \text{ c.p.s.} \\ 59.96 \times 10^{13} - 8.394 \times 10^{13} = 51.57 \times 10^{13} \text{ c.p.s.} \end{cases}$ Raman wave length: $\lambda_R =$ $\begin{cases} \frac{2.998 \times 10^{10}}{50.37 \times 10^{13}} = 5.952 \times 10^{-5} \text{ cm.} = 5952 \text{ A.U.} \\ \frac{2.998 \times 10^{10}}{50.97 \times 10^{13}} = 5.882 \times 10^{-5} \text{ cm.} = 5882 \text{ A.U.} \\ \frac{2.998 \times 10^{10}}{51.57 \times 10^{13}} = 5.813 \times 10^{-5} \text{ cm.} = 5813 \text{ A.U.} \end{cases}$ Water line: wave number = 3151 cm.$^{-1} = \frac{1}{\lambda}$ Water line frequency = $f_{H_2O} = cx\frac{1}{\lambda} = 2.998 \times$ $10^{10 cm.} \cdot$ sec. $\times 3151$ cm.$^{-1} = 9.447 \times 10^{13}$ c.p.s.

Water line: Raman: = $59.96 \times 10^{13} -$ $9.447 \times 10^{13} = 50.51 \times 10^{13}$ c.p.s.

Wave length of Raman water line:
$$\frac{2.998 \times 10^{10}}{50.51 \times 10^{13}} = 5.935 \times 10^{-5} \text{ cm.} = 5935 \text{ A.U.}$$

Slit before photomultiplier tube must reject water line at 5935 A.U. It would be satisfactory if it passed the range between 5815 A.U. and 5925 A.U.

Since certain changes in carrying out the above method, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An apparatus for locating the presence of oil in a bore hole by the analysis of scattered Raman radiation comprising unitary means containing in optical alignment a monochromatic laser radiation source, an optical filter for eliminating light of wave lengths other than that of the desired monochromatic radiation from said source, a window for transmitting radiation from said source and receiving scattered light from the walls of a bore hole, a spectroscopic filter for passing only desired Raman radiation scattered from the walls of said bore, means located between said optical filter and said spectroscopic filter for separating the radiation passed by said optical filter and the scattered radiation to be received by said spectroscopic filter, means for detecting and generating a signal proportional to the passed Raman radiation, a transmitter for transmitting said signal coupled to said means for detecting, said transmitted signal being characteristic of any oil deposits in the bore hole and a receiving means located at the surface of the ground coupled to said transmitter for recording said signal.

2. An apparatus in accordance with claim 1, wherein the laser source, the optical filter, the spectroscopic filter and the means for detecting are housed in a casing means within the unitary means.

3. An apparatus in accordance with claim 2, wherein the window is at the end of a tubular extension of the casing means and projects through a wall of the unitary means.

4. An apparatus in accordance with claim 3, wherein means are provided to move said casing for orienting the window adjacent the bore hole wall and for withdrawing it therefrom.

References Cited

UNITED STATES PATENTS 2,334,475  11/1943  Claudet _____ 88—14
3,247,381  4/1966  Caldwell et al. _____ 250—83.6

OTHER REFERENCES

Black: "Lasers Cost Light on Machining Welding Problems," Tool and Manufacturing Engineer, June 1962.

Porto et al: "Ruby Optical Maser As a Raman Source,' J. Opt. Soc. Am., March 1962.

JEWELL H. PEDERSEN, *Primary Examiner.*

F. L. EVANS, *Assistant Examiner.*